US008867357B2

(12) United States Patent
Yang et al.

(10) Patent No.: US 8,867,357 B2
(45) Date of Patent: Oct. 21, 2014

(54) PROCESSING NETWORK TRAFFIC AT A NETWORK EDGE

(75) Inventors: Jin Yang, Orinda, CA (US); Yee Sin Chan, San Jose, CA (US); Lee K. Tjio, Danville, CA (US); Sagiv Draznin, Walnut Creek, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 178 days.

(21) Appl. No.: 13/323,085

(22) Filed: Dec. 12, 2011

(65) Prior Publication Data

US 2013/0148502 A1 Jun. 13, 2013

(51) Int. Cl.
*H04L 12/26* (2006.01)

(52) U.S. Cl.
USPC .......................................... 370/235

(58) Field of Classification Search
None
See application file for complete search history.

(56) References Cited

U.S. PATENT DOCUMENTS

| 2004/0176126 A1* | 9/2004 | Sato et al. ...................... 455/522 |
| 2005/0276249 A1* | 12/2005 | Damnjanovic et al. ........ 370/335 |
| 2008/0214221 A1* | 9/2008 | Kiyomoto et al. ............. 455/517 |
| 2009/0069036 A1* | 3/2009 | Yotsumoto .................. 455/456.5 |
| 2009/0149221 A1* | 6/2009 | Liu et al. ....................... 455/561 |
| 2010/0296485 A1* | 11/2010 | Kobori ........................... 370/331 |
| 2011/0158171 A1* | 6/2011 | Centonza et al. ............. 370/328 |

* cited by examiner

*Primary Examiner* — Chirag Shah
*Assistant Examiner* — Rina Pancholi (57) ABSTRACT

A device, provided at a network edge, receives a radio frequency signal from a user equipment, and converts the radio frequency signal into an electrical signal. The device also receives, from a network controller, at least one of control information, schedule information, or congestion management information. The device performs baseband signal processing on the electrical signal, based on at least one of the control information, the schedule information, or the congestion management information, to create a modified signal. The device provides the modified signal to the network controller.

23 Claims, 9 Drawing Sheets

PROCESSING NETWORK TRAFFIC AT A NETWORK EDGE

BACKGROUND

A fourth generation (4G) wireless network is an all Internet protocol (IP) wireless network in which different advanced multimedia application services (e.g., voice over IP (VoIP) content, video content, etc.) are delivered over IP. 4G wireless networks include a radio access network, such as, for example, a long term evolution (LTE) network or an enhanced high rate packet data (eHRPD) network. 4G wireless networks also include an IP multimedia subsystem (IMS) network and a wireless core network, referred to as an evolved packet core (EPC) network. The LTE network is often called an evolved universal terrestrial radio access network (E-UTRAN). The EPC network is an all-IP packet-switched core network that supports high-speed wireless and wireline broadband access technologies. An evolved packet system (EPS) is defined to include the LTE (or eHRPD) network and the EPC network.

The EPS may include a packet data network (PDN) gateway (PGW), a serving gateway (SGW), a home subscriber server (HSS), and a mobility management entity (MME). The PGW is provided in the EPC network and provides connectivity of user equipment (UE) to external PDNs by being a traffic exit/entry point for the UE. The SGW is provided in the EPC network, routes and forwards user data packets, and acts as a mobility anchor for a user plane during inter-eNodeB (eNB) handovers. The HSS is provided in the IMS network and includes a database where UE subscriber profile information is stored. The MME is provided in the EPC network and is responsible for handling control plane signaling with UEs as the UEs are provided access to different PDNs.

With the deployment of large amounts of small cells, such as micro cells or pico cells, in a cellular network, traditional network architecture may be more tightly integrated to maximize network efficiency. However, the traditional network architecture is designed in a centralized fashion for core network elements, such as the PGW, the SGW, and the MME. Such core network elements are limited in deployment within the core network (e.g., the EPC network), which creates undesired latency and complications due to long backhauls.

In one example centralized network architecture, a centralized base station can be connected to distributed remote radio heads (RRHs) through high-capacity transport backhauls, such as optical fiber. The centralized network architecture may be an attractive deployment option from a capacity perspective, but requires the availability of expensive high-capacity transport backhauls. In locations where high-capacity transport backhauls are not available or are not economically justifiable, the centralized network architecture may be maintained through an Ethernet operation, administration, and maintenance (OAM) interface or an X2 interface. However, such an arrangement is unable to maximize network capacity since the arrangement only permits long term feedback and coordination for functions. Without real-time feedback from a UE, such as reference signal received power (RSRP) and reference signal received quality (RSRQ) feedback, the capacity of such an arrangement is greatly diminished.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for handling of network traffic at a network edge rather than within a core network. In one example implementation, a baseband processing module and a radio processing module may be located within a remote access head (RAH) provided at a network edge. One or more RAHs may connect (e.g., via a fiber connection) to a network controller, and the network controller may connect to one or more core network elements, such as a SGW, a PGW, a MME, etc. Such an arrangement may significantly reduce a transport data rate between the RAH and the network controller because data intensive communications (e.g., RSRP and RSRQ feedback) between the RAH and the baseband processing module may be eliminated by moving the baseband processing module to the RAH. Such an arrangement may facilitate coordination and adaptation to interference from other RAHs, and may maximize network capacity.

Alternatively, or additionally, network traffic processing may be virtually provided at a network edge, such as within an eNB or within a probe device connected to the eNB. The virtual network processing may process network traffic in a manner typically handled by core network elements, such as a SGW, a PGW, etc. For example, the virtual network processing may act as a primary gateway for traffic provided by UEs. Such an arrangement may reduce backhaul traffic transport to the core network elements, and may improve user experience.

As used herein, the terms "subscriber" and/or "user" may be used interchangeably. Also, the terms "subscriber" and/or "user" are intended to be broadly interpreted to include a UE, or a user of a UE.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
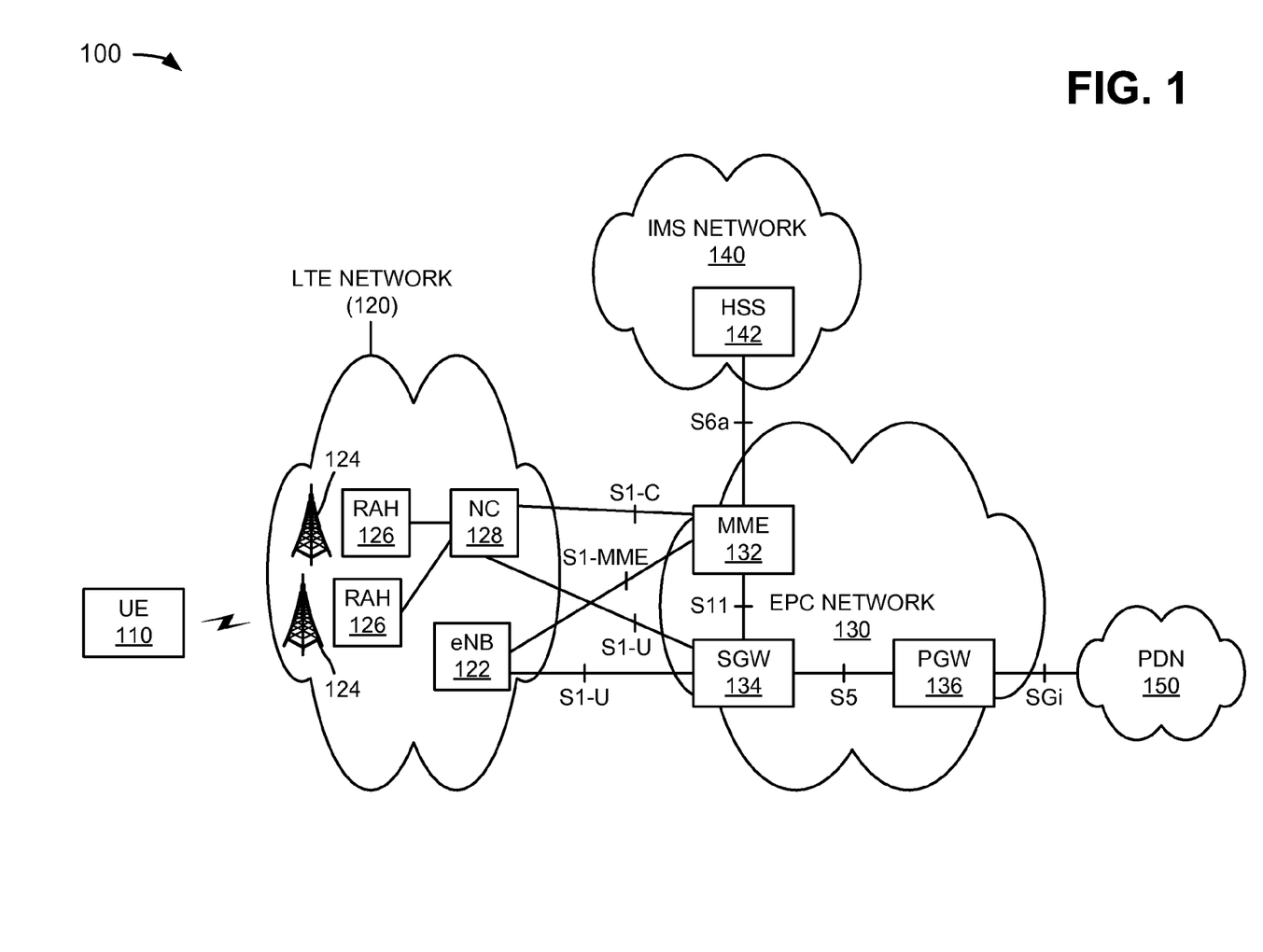
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, a LTE network 120, an EPC network 130, an IMS network 140, and a PDN 150. LTE network 120 may include a base station or an eNB 122, one or more radio antennas 124, one or more RAHs 126, and a network controller (NC) 128. EPC network 130 may include a MME 132, a SGW 134, and a PGW 136. IMS network 140 may include a HSS 142. Devices and/or networks of network 100 may interconnect via wired and/or wireless connections.

One UE 110, one LTE network 120, one eNB 122, two radio antennas 124, two RAHs 126, one network controller 128, one EPC network 130, one MME 132, one SGW 134, one PGW 136, one IMS network 140, one HSS 142, and one PDN 150 have been illustrated in FIG. 1 for simplicity. In practice, there may be more UEs 110, LTE networks 120, eNBs 122, radio antennas 124, RAHs 126, network controllers 128, EPC networks 130, MMEs 132, SGWs 134, PGWs 136, IMS networks 140, HSSs 142, and/or PDNs 150. As further shown in FIG. 1, eNB 122 may interface with MME 132 over a S1-MME interface, and may interface with SGW 134 over a S1-U interface. Network controller 128 may interface with MME 132 over a S1-C interface, and may interface with SGW 134 over a S1-U interface. MME 132 may interface with SGW 134 over a S11 interface, and may interface with HSS 142 over a S6a interface. SGW 134 may interface with PGW 136 over a S5 interface. PGW 136 may interface with PDN 150 over a SGi interface.

UE 110 may include a radiotelephone; a personal communications system (PCS) terminal, that may, for example, combine a cellular radiotelephone with data processing and data communications capabilities; a wireless telephone; a cellular telephone; a smart phone; a personal digital assistant (PDA) that can include, for example, a radiotelephone, a pager, Internet/intranet access, etc.; a laptop computer (e.g., with a wireless air card); or other types of computation and/or communication devices. In one example, UE 110 may include a device that is capable of communicating over LTE network 120, EPC network 130, IMS network 140, and/or PDN 150.

LTE network 120 may include a communications network that connects subscribers (e.g., UEs 110) to a service provider. In one example, LTE network 120 may include a WiFi network (e.g., using IEEE 802.11 standards) or other access networks (e.g., an E-UTRAN or an eHRPD network). In another example, LTE network 120 may include a radio access network capable of supporting a high data rate, low latency, packet optimization, a large capacity and coverage, etc.

eNB 122 may include one or more computation and/or communication devices that receive traffic (e.g., voice and/or data) from MME 132 and/or SGW 134 and wirelessly transmit that traffic to UE 110. eNB 122 may also include one or more devices that wirelessly receive traffic from UE 110 and transmit that traffic to one of MME 132 and/or SGW 134 or to other UEs 110. eNB 122 may combine the functionalities of a base station and a radio network controller (RNC) in 2G or 3G radio access networks.

Radio antenna 124 may include one or more antennas to transmit and/or receive RF signals or traffic over the air. Radio antenna 124 may, for example, receive RF signals from RAH 126 and transmit them over the air to UE 110, and receive RF signals over the air from UE 110 and provide them to RAH 126.

RAH 126 may include one or more devices that provide RF circuitry, analog-to-digital (A/D) converters, digital-to-analog (D/A) converters, up/down converters, etc. RAH 126 may include operation and management processing capabilities and a standardized optical interface to connect to network controller 128. RAH 126 may make multiple-input and multiple-output (MIMO) operations easier, may increase efficiency, and may facilitate physical location for gap coverage problems. In one example implementation, RAH 126 may interconnect with network controller 128 via a S1-U/C interface that is much lower in cost than a cost associated with a high-capacity transport backhaul.

On a receiving path, RAH 126 may receive a RF signal, including channel state information, and may process the RF signal. RAH 126 may provide the processed RF signal to network controller 128, and network controller 128 may utilize the processed RF signal to schedule information for each UE 110 and to coordinate a transmission scheme between RAHs 126 controlled by network controller 128. On a transmitting path, RAH 126 may receive user information from network controller 128, and may process the user information according to control/schedule information received from network controller 128. RAH 126 may convert the processed user information to a RF signal, and may transmit the RF signal to a UE 110 directed by network controller 128.

Network controller 128 may include one or more devices that may control and/or manage one or more RAHs 126, and may perform data processing to manage utilization of radio network services for RAHs 126. Network controller 128 may transmit/receive traffic to/from RAHs 126, MME 132, SGW 134, and/or other network controllers. In one example implementation, network controller 128 may directly route local traffic from one RAH 126, within a cluster of RAHs 126, to another RAH 126 within the cluster, without involving EPC network 130.

EPC network 130 may include a core network architecture of the Third Generation Partnership Project (3GPP) LTE wireless communication standard. In one example, EPC network 130 may include an all-IP packet-switched core network that supports high-speed wireless and wireline broadband access technologies. Alternatively, or additionally, EPC network 130 may provide packet-switched services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110), and may choose a SGW for UE 110 at an initial attach and at a time of intra-LTE handover. MME 132 may authenticate UE 110 via interaction with HSS 142. Non-access stratum (NAS) signaling may terminate at MME 132, and MME 132 may generate and allocate temporary identities to UEs 110. MME 132 may check authorization of UE 110 to camp on a service provider's Public Land Mobile Network (PLMN), and may enforce roaming restrictions for UE 110. MME 132 may be a termination point in EPC network 130 for ciphering/integrity protection for NAS signaling, and may handle security key management. MME 132 may provide a control plane function for mobility between LTE and access networks.

SGW 134 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation, SGW 134 may route and forward user data packets, may act as a mobility anchor for a user plane during inter-eNB handovers, and may act as an anchor for mobility between LTE and other 3GPP technologies. For an idle state UE 110, SGW 134 may terminate a downlink (DL) data path, and may trigger paging when DL traffic arrives for UE 110. SGW 134 may manage and store contexts associated with UE 110 (e.g., parameters of an IP bearer service, network internal routing information, etc.).

PGW 136 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 136 may provide connectivity of UE 110 to external PDNs (e.g., PDN 150) by being a traffic exit/entry point for UE 110. UE 110 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more computation and/or communication devices that gather, process, search, and/or provide information in a manner described herein. In one example implementation, HSS 142 may include a master user database that supports devices of IMS network 140 that handle calls. HSS 142 may include subscription-related information (e.g., subscriber profiles), may perform authentication and authorization of a user, and may provide information about a subscriber's location and IP information.

PDN 150 may include one or more networks, such as a local area network (LAN), a wide area network (WAN), a metropolitan area network (MAN), a telephone network, the Internet, etc., capable of communicating with UE 110. In one example, PDN 150 may include a network that breaks up a message (e.g., information) into packets for transmission. Unlike a circuit switching network, which requires establishment of a dedicated point-to-point connection, each packet in PDN 150 may include a destination address. Thus, packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
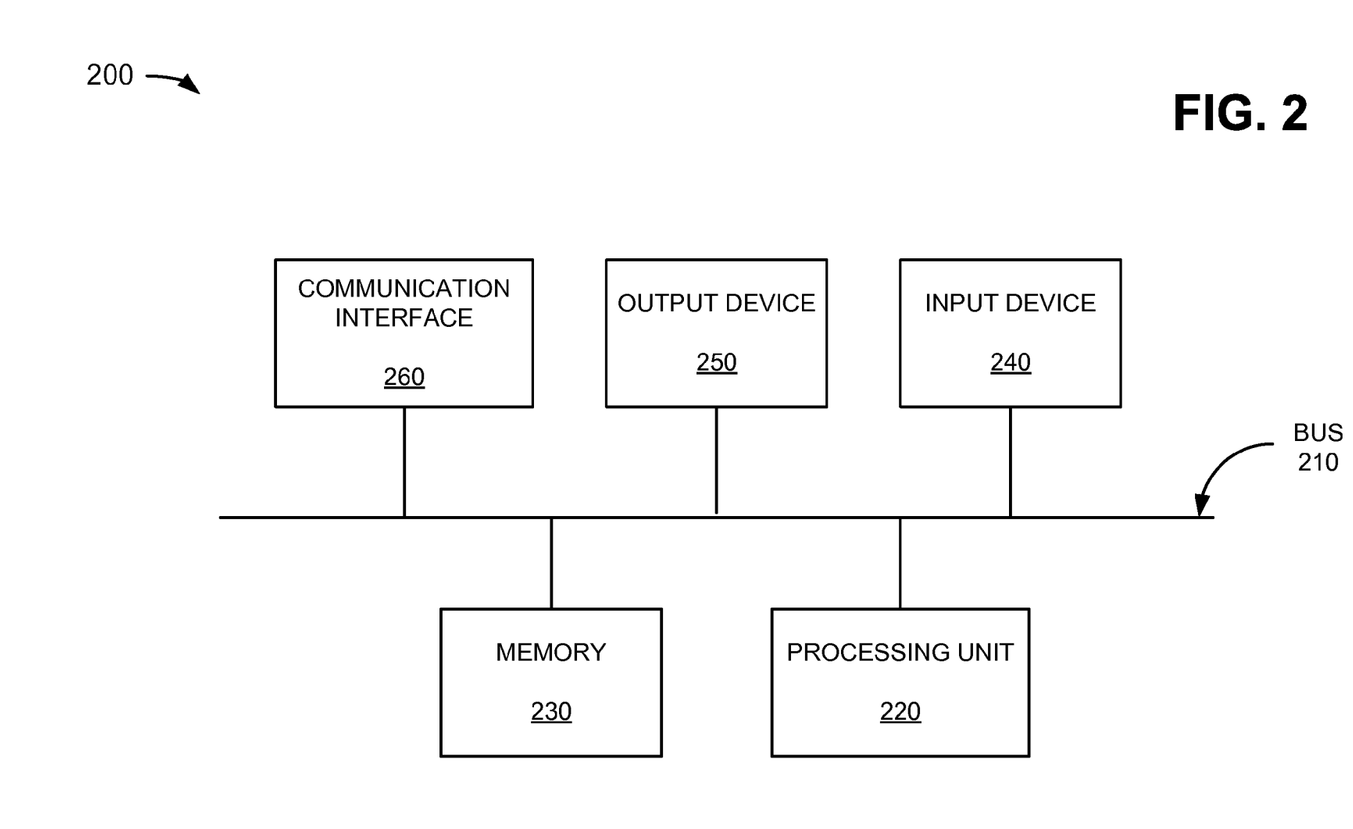
FIG. 2 is a diagram of example components of a device that may correspond to one of the devices of the network depicted in FIG. 1.

FIG. 2 is a diagram of example components of a device 200 that may correspond to one of the devices of network 100. In one example implementation, one or more of the devices of network 100 may include one or more devices 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
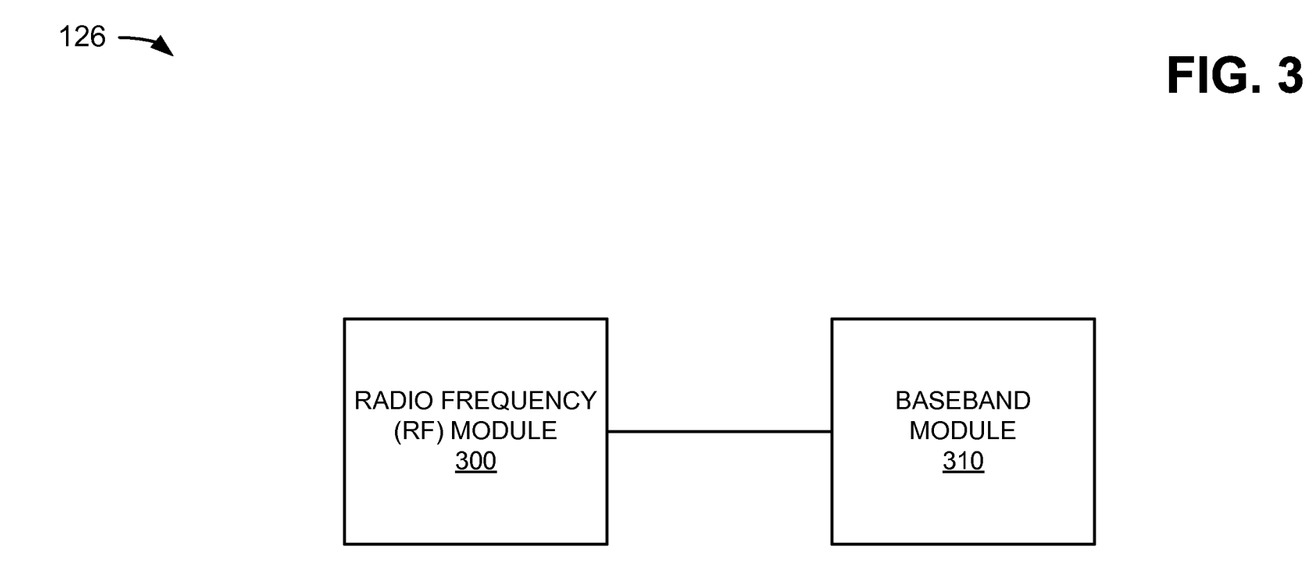
FIG. 3 is a diagram of example functional components of a remote access head (RAH) of the network illustrated in FIG. 1.

FIG. 3 is a diagram of example functional components of RAH 126. In one implementation, the functions described in connection with FIG. 3 may be performed by one or more components of device 200 (FIG. 2) or by one or more devices 200. As shown in FIG. 3, RAH 126 may include a radio frequency (RF) module 300 and a baseband module 310.

RF module 300 may connect to antenna 124 (FIG. 1) and may include a transmission power amplifier and a low-noise receiving amplifier for amplifying sent and/or received RF signals. RF module 300 may perform D/A conversion of transmission signals spread on the baseband, which may convert the transmission signals to RF signals in quadrature modulation. RF module 300 may perform quasi-coherent detection and A/D conversion of signals received from the low-noise receiving amplifier.

Baseband module 310 may perform error correction coding, framing, data modulation, and spreading modulation of transmitted data. For a received signal, baseband module 310 may perform despreading, chip synchronization, error correction decoding, data demultiplexing, rake reception, diversity handover between sectors, etc. In one example, baseband module 310 may provide feedback, such as RSRP and/or RSRQ measurements from UE 110 (FIG. 1), to RF module 300.

In one example implementation, RF module 300 may receive a RF signal from UE 110 (FIG. 1), and may convert the RF signal into an electrical signal (e.g., a baseband signal). RF module 300 may provide the electrical signal to baseband module 310. Baseband module 310 may receive control, schedule, and/or congestion management information from network controller 128 (FIG. 1), and may perform baseband signal processing on the electrical signal, based on the control, schedule, and/or congestion management information, to create a modified signal. For example, baseband module 310 may perform error correction on the electrical signal to create the modified signal. Baseband module 310 may provide the modified signal to network controller 128, and network controller 128 may forward the modified signal to a destination. Alternatively, or additionally, baseband module 310 may provide the modified signal to RF module 300. RF module 300 may convert the modified signal into a modified RF signal, and may forward the modified RF signal to another destination.

On a receiving path, RAH 126 may receive a RF signal (e.g., via RF module 300), including channel state information, and may process the RF signal (e.g., via baseband module 310). RAH 126 may provide the processed RF signal to network controller 128, and network controller 128 may utilize the processed RF signal to schedule information for each UE 110 and to coordinate a transmission scheme between RAHs 126 controlled by network controller 128. On a transmitting path, RAH 126 may receive user information from network controller 128, and may process the user information according to control/schedule information received from network controller 128 (e.g., via baseband module 310). RAH 126 may convert the processed user information to a RF signal, and may transmit the RF signal (e.g., via RF module 300) to a UE 110 directed by network controller 128.

Although FIG. 3 shows example functional components of RAH 126, in other implementations, RAH 126 may include fewer functional components, different functional components, differently arranged functional components, or additional functional components than depicted in FIG. 3. Alternatively, or additionally, one or more functional components of RAH 126 may perform one or more other tasks described as being performed by one or more other functional components of RAH 126.

Figure 4:
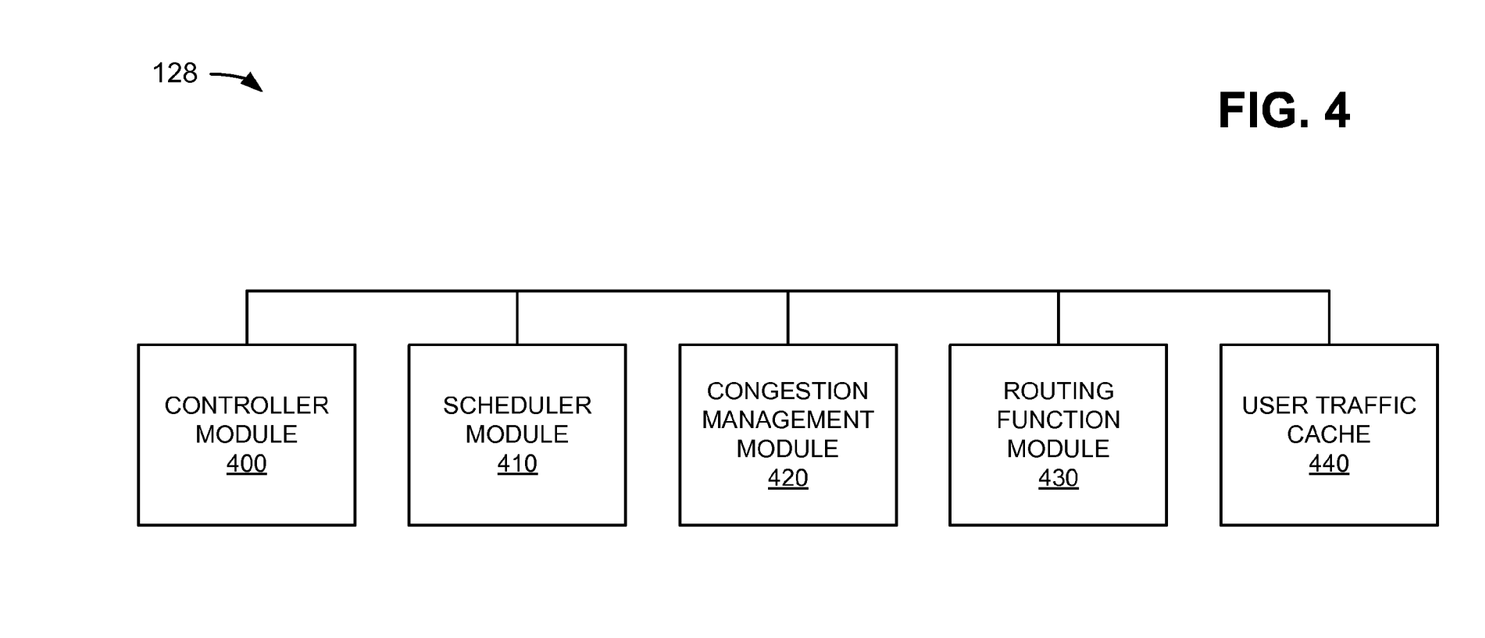
FIG. 4 is a diagram of example functional components of a network controller of the network depicted in FIG. 1.

FIG. 4 is a diagram of example functional components of network controller 128. In one implementation, the functions described in connection with FIG. 4 may be performed by one or more components of device 200 (FIG. 2) or by one or more devices 200. As shown in FIG. 4, network controller 128 may include a controller module 400, a scheduler module 410, a congestion management module 420, a routing function module 430, and a user traffic cache 440.

Controller module 400 may send and/or receive control information or signals to and/or from RAHs 126. The control information may include, for example, information that controls, sets, and/or releases radio links associated with RAHs 126.

Scheduler module 410 may send and/or receive schedule information to and/from RAHs 126. The schedule information may include, for example, information that schedules which of RAHs 126 to transmit signals and when to transmit signals. In one example, the schedule information may schedule a particular RAH 126 to transmit signals based on a time of day, traffic load conditions, frequency, power and space domains, etc.

Congestion management module 420 may send and/or receive congestion management information to and/or from RAHs 126. The congestion management information may include, for example, information that schedules one or more RAHs 126 to transmit signals based on traffic load conditions associated with one or more RAHs 126. In one example, the congestion management information may select a particular RAH 126 to transmit signals when the particular RAH 126 is processing a least amount of traffic.

Routing function module 430 may route local traffic directly from one RAH 126 to one or more other RAHs 126. User traffic cache 440 may store user traffic from UEs 110, and may transmit and/or receive the user traffic.

Although FIG. 4 shows example functional components of network controller 128, in other implementations, network controller 128 may include fewer functional components, different functional components, differently arranged functional components, or additional functional components than depicted in FIG. 4. Alternatively, or additionally, one or more functional components of network controller 128 may perform one or more other tasks described as being performed by one or more other functional components of network controller 128.

Figure 5:
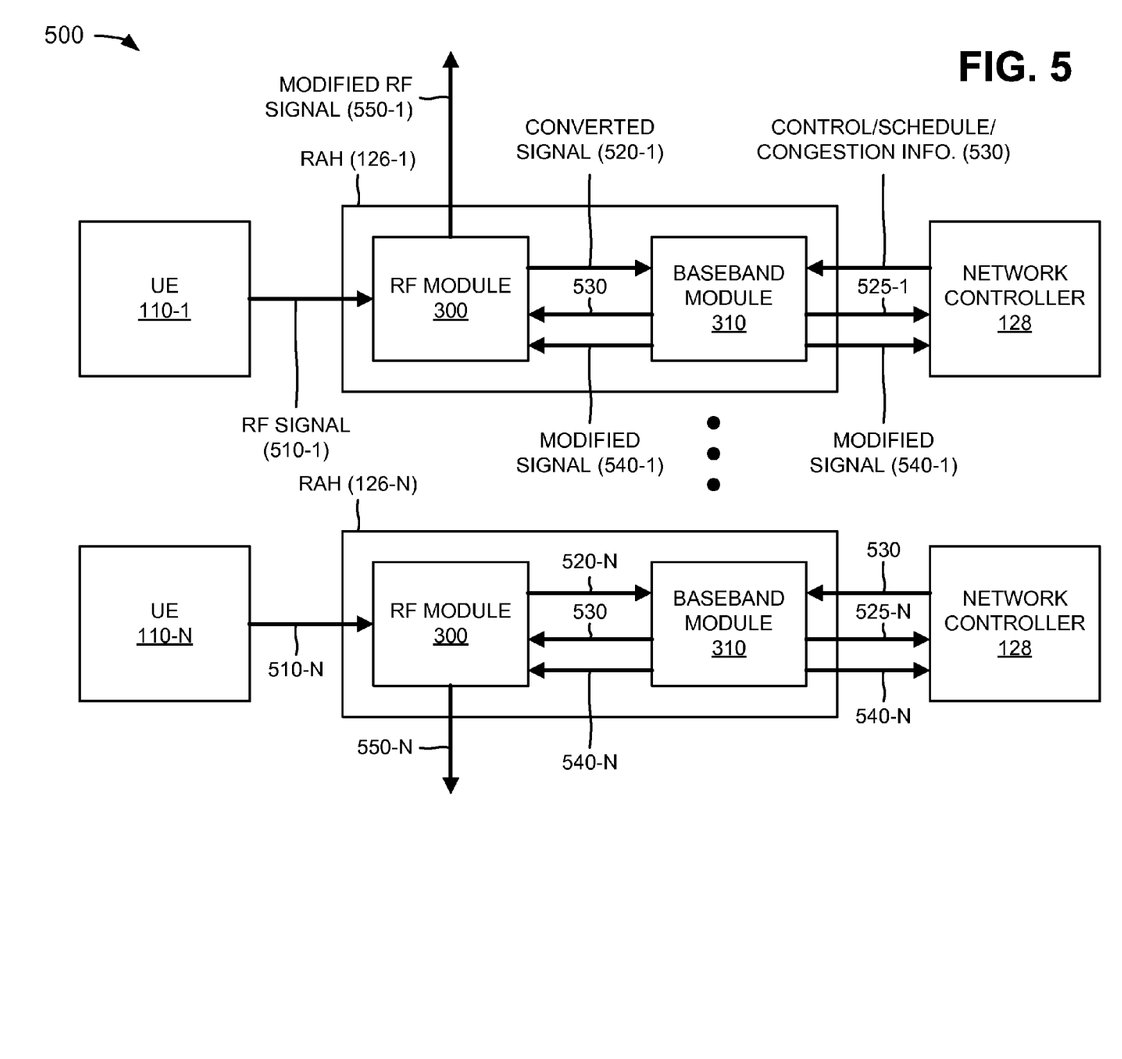
FIG. 5 is a diagram of example operations capable of being performed by an example portion of the network in FIG. 1.

FIG. 5 is a diagram of example operations capable of being performed by an example portion 500 of network 100 (FIG. 1). As shown in FIG. 5, network portion 500 may include multiple UEs 110-1 through 110-N, multiple RAHs 126-1 through 126-N, network controller 128, RF module 300, and baseband module 310. UEs 110, RAHs 126, network controller 128, RF module 300, and baseband module 310 may include the features described above in connection with, for example, one or more of FIGS. 1-4. In one example, network controller 128 may direct UEs 110 to connect to multiple RAHs 126 for coordinated multiple layers of transmitted and received signals.

As further shown in FIG. 5, UE 110-1 may provide a RF signal 510-1 to RF module 300 of RAH 126-1, and RF module 300 may receive RF signal 510-1. RF signal 510-1 may include user traffic to be provided to other UEs 110 or to other elements of network 100 (FIG. 1). RF module 300 may convert RF signal 510-1 into a converted signal 520-1 (e.g., an electrical signal, such as baseband signal), and may provide converted signal 520-1 to baseband module 310. Baseband module 310 may receive converted signal 520-1 from RF module 300, and may provide channel information 525-1 (e.g., information associated with an established channel) to network controller 128. Baseband module 310 may receive control, schedule, and/or congestion management information 530 from network controller 128. The control portion of information 530 may include, for example, information that controls, sets, and/or releases radio links associated with RAH 126-1. The schedule portion of information 530 may include, for example, information that schedules RAH 126-1 to transmit signals based on a time of day, traffic load conditions, frequency, power and space domains, etc. The congestion management portion of information 530 may include, for example, information that schedules RAH 126-1 to transmit signals based on traffic load conditions associated with RAH 126-1.

Baseband module 310 may perform baseband signal processing on converted signal 520-1, based on control, schedule, and/or congestion management information 530, to create a modified signal 540-1 (e.g., user traffic). For example, baseband module 310 may perform signal to noise ratio correction on converted signal to create modified signal 540-1, may incorporate feedback (e.g., RSRP and/or RSRQ feedback) into modified signal 540-1, etc. Baseband module 310 may provide modified signal 540-1 to network controller 128, and network controller 128 may forward modified signal 540-1 to a destination, such as EPC network 130. Alternatively, or additionally, baseband module 310 may provide modified signal 540-1 to RF module 300. RF module 300 may convert modified signal 540-1 into a modified RF signal 550-1, and may forward modified RF signal 550-1 to another destination, such as another UE 110.

As further shown in FIG. 5, UE 110-N may provide a RF signal 510-N to RF module 300 of RAH 126-N, and RF module 300 may receive RF signal 510-N. RF signal 510-N may include user traffic to be provided to other UEs 110 or to other elements of network 100 (FIG. 1). RF module 300 may convert RF signal 510-N into a converted signal 520-N (e.g., an electrical signal, such as baseband signal), and may provide converted signal 520-N to baseband module 310. Baseband module 310 may receive converted signal 520-N from RF module 300, and may provide channel information 525-N (e.g., information associated with an established channel) to network controller 128. Baseband module 310 may receive control, schedule, and/or congestion management information 530 from network controller 128. The control portion of information 530 may include, for example, information that controls, sets, and/or releases radio links associated with RAH 126-N. The schedule portion of information 530 may include, for example, information that schedules RAH 126-N to transmit signals based on a time of day, traffic load conditions, frequency, power and space domains, etc. The congestion management portion of information 530 may include, for example, information that schedules RAH 126-N to transmit signals based on traffic load conditions associated with RAH 126-N.

Baseband module 310 may perform baseband signal processing on converted signal 520-N, based on control, schedule, and/or congestion management information 530, to create a modified signal 540-N (e.g., user traffic). For example, baseband module 310 may perform signal to noise ratio correction on converted signal 520-N to create modified signal 540-N, may incorporate feedback (e.g., RSRP and/or RSRQ feedback) into modified signal 540-N, etc. Baseband module 310 may provide modified signal 540-N to network controller 128, and network controller 128 may forward modified signal 540-N to a destination, such as EPC network 130. Alternatively, or additionally, baseband module 310 may provide modified signal 540-N to RF module 300. RF module 300 may convert modified signal 540-N into a modified RF signal 550-N, and may forward modified RF signal 550-N to another destination, such as another UE 110.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
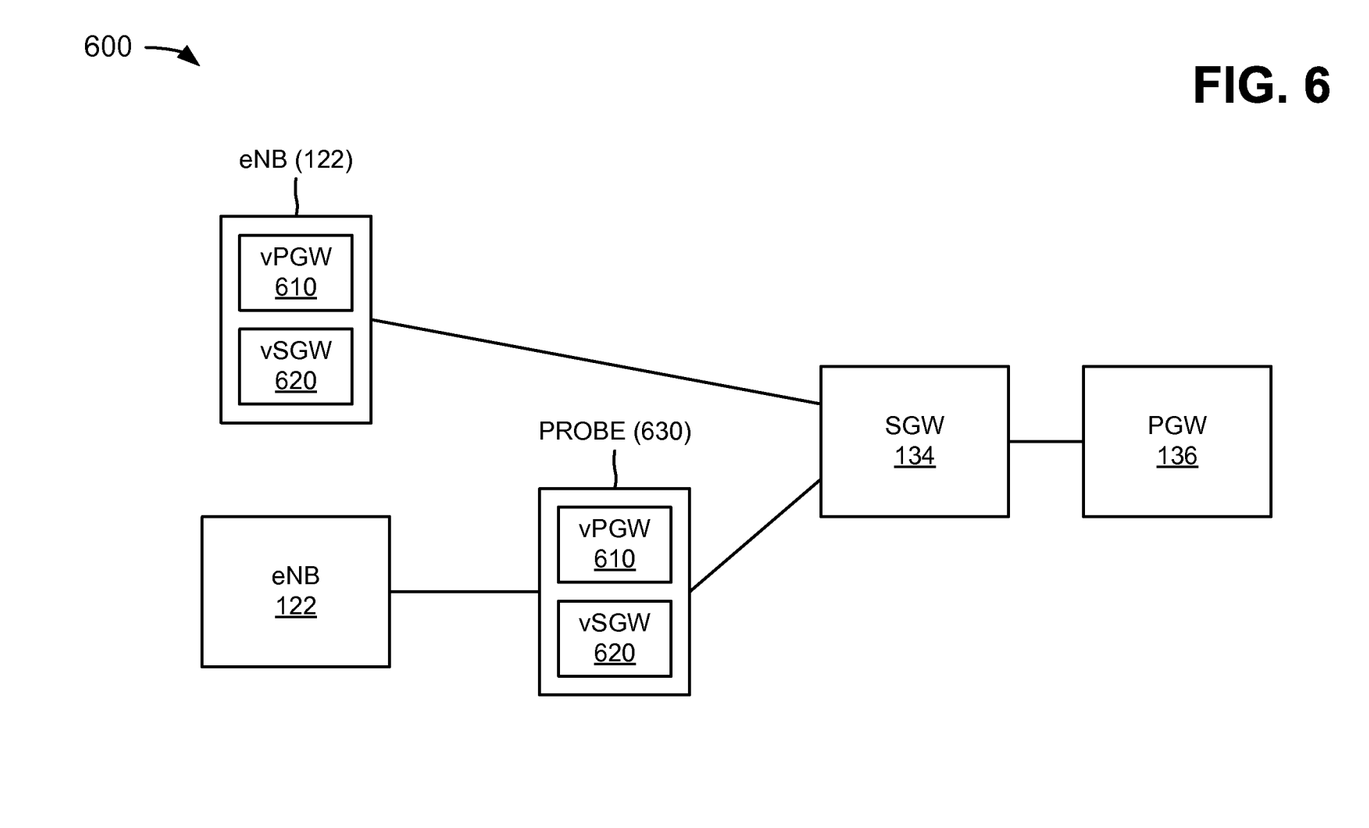
FIG. 6 is a diagram of example interconnections and functional components of another example portion of the network in FIG. 1.

FIG. 6 is a diagram of example interconnections and functional components of another example portion 600 of network 100 (FIG. 1). As shown in FIG. 6, network portion 600 may include two eNBs 122, SGW 134, PGW 136, two virtual PGWs (vPGWs) 610, two virtual SGWs (vSGWs) 620, and a probe device 630. eNBs 122, SGW 134, PGW 136 may include the features described above in connection with, for example, one or more of FIGS. 1 and 2. In one implementation, the functions described in connection with FIG. 6 may be performed by one or more components of device 200 (FIG. 2) or by one or more devices 200.

vPGW 610 may include a virtual form of PGW 136, and may include the functionality of PGW 136 described above in connection with FIG. 1. vPGW 610 may signal, to PGW 136, a request for session establishment for UE 110 (FIG. 1). PGW 136 may include processing for validating a session, and may validate the session based on the request. After session validation, vPGW 610 may act as a primary gateway for local traffic associated with UE 110, which may allow for session resiliency, may reduce backhaul traffic and latency, and may improve user experience. vPGW 610 may query PGW 136 for decisions that cannot be made locally by vPGW 610, such as decisions for an unknown user, an unknown packet, a policy, etc. vPGW 610 may terminate one or more connections with UEs 110.

vSGW 620 may include a virtual form of SGW 134, and may include the functionality of SGW 134 described above in connection with FIG. 1. vSGW 620 may signal, to SGW 134, a request for session establishment for UE 110 (FIG. 1). SGW 134 may include processing for validating a session, and may validate the session based on the request. After session validation, vSGW 620 may act as a primary gateway for local traffic associated with UE 110, which may allow for session resiliency, may reduce backhaul traffic and latency, and may improve user experience. vSGW 620 may query SGW 134 for decisions that cannot be made locally by vSGW 620, such as decisions for an unknown user, an unknown packet, a policy, etc. vSGW 620 may terminate one or more connections with UEs 110.

As further shown in FIG. 6, vPGW 610 and/or vSGW 620 may be provided in eNB 122, such as within a cell router of eNB 122. Alternatively, or additionally, vPGW 610 and/or vSGW 620 may be provided in probe device 630 that is separate from eNB 122. eNB 122, which includes vPGW 610 and/or vSGW 620, may connect to SGW 134. eNB 122, without vPGW 610 and/or vSGW 620, may connect to probe device 630 and probe device 630 may connect to SGW 134. SGW 134 may connect to PGW 136. Such interconnections may enable vPGW 610 and vSGW 620 to communicate with PGW 136 and SGW 134, respectively for decisions that cannot be made locally by vPGW 610 and vSGW 620. In one example implementation, PGW 136 may provide the functionality, described above for PGW 136 (in FIG. 1), to vPGW 610 via the interconnections, and SGW 134 may provide the functionality, described above for SGW 134 (in FIG. 1), to vSGW 620 via the interconnections.

Although FIG. 6 shows example components of network portion 600, in other implementations, network portion 600 may include fewer components, different components, differently arranged components, or additional components than depicted in FIG. 6. Additionally, or alternatively, one or more components of network portion 600 may perform one or more other tasks described as being performed by one or more other components of network portion 600.

Figure 7:
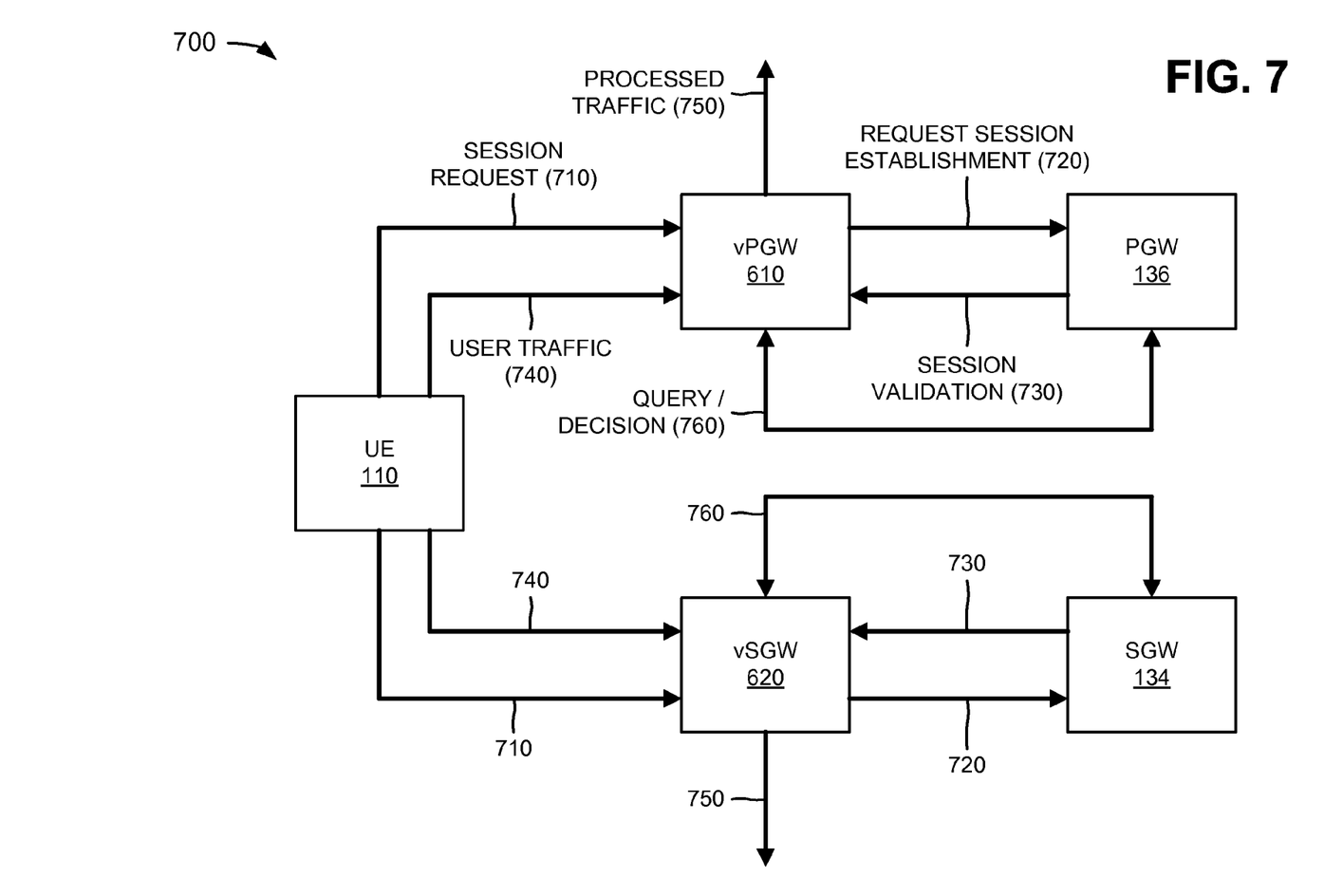
FIG. 7 is a diagram of example operations capable of being performed by still another example portion of the network in FIG. 1.

FIG. 7 is a diagram of example operations capable of being performed by still another example portion 700 of network 100 (FIG. 1). As shown in FIG. 7, network portion 700 may include UE 110, SGW 134, PGW 136, vPGW 610, and vSGW 620. UE 110, SGW 134, PGW 136, vPGW 610, and vSGW 620 may include the features described above in connection with, for example, one or more of FIGS. 1, 2, and 6.

As further shown in FIG. 7, UE 110 may provide a session request 710 to vPGW 610, and vPGW 610 may receive session request 710. Session request 710 may include a request to establish a session for UE 110. vPGW 610 may request, from PGW 136, establishment of the session for UE 110, as indicated by reference number 720. PGW 136 may validate the session, and may provide a session validation indication 730 to vPGW 610. vPGW 610 may receive session validation indication 730, and may establish the session for UE 110. After the session is validated and established for UE 110, UE 110 may provide user traffic 740 to vPGW 610, and vPGW 610 may receive user traffic 740.

vPGW 610 may determine whether user traffic 740 can be locally processed by vPGW 610. If user traffic 740 can be locally processed by vPGW 610, vPGW 610 may process user traffic 740 (e.g., may perform policy enforcement, packet filtering, charging support, lawful intercept, and packet screening), and may forward the processed user traffic 740 to a destination, as indicated by reference number 750. If user traffic 740 cannot be locally processed by vPGW 610, vPGW 610 may query PGW 136 for processing instructions, as indicated by reference number 760. PGW 136 may provide processing instructions in a decision provided in response to the query, as further indicated by reference number 760. vPGW 610 may receive the processing instructions, and may process user traffic 740 based on the processing instructions. vPGW 610 may forward the processed user traffic 740 to a destination, as indicated by reference number 750.

Alternatively, or additionally, UE 110 may provide session request 710 to vSGW 620, and vSGW 620 may receive session request 710. vSGW 620 may request, from SGW 134, establishment of the session for UE 110, as indicated by reference number 720. SGW 134 may validate the session, and may provide session validation indication 730 to vSGW 620. vSGW 620 may receive session validation indication 730, and may establish the session for UE 110.

After the session is validated and established for UE 110, UE 110 may provide user traffic 740 to vSGW 620, and vSGW 620 may receive user traffic 740.

vSGW 620 may determine whether user traffic 740 can be locally processed by vSGW 620. If user traffic 740 can be locally processed by vSGW 620, vSGW 620 may process user traffic 740 (e.g., may terminate a DL data path, may trigger paging when DL traffic arrives for UE 110, may manage and store contexts associated with UE 110, etc.), and may forward the processed user traffic 740 to a destination, as indicated by reference number 750. If user traffic 740 cannot be locally processed by vSGW 620, vSGW 620 may query SGW 134 for processing instructions, as indicated by reference number 760. SGW 134 may provide processing instructions in a decision provided in response to the query, as further indicated by reference number 760. vSGW 620 may receive the processing instructions, and may process user traffic 740 based on the processing instructions. vSGW 620 may forward the processed user traffic 740 to a destination, as indicated by reference number 750.

Although FIG. 7 shows example components of network portion 700, in other implementations, network portion 700 may include fewer components, different components, differently arranged components, or additional components than depicted in FIG. 7. Additionally, or alternatively, one or more components of network portion 700 may perform one or more other tasks described as being performed by one or more other components of network portion 700.

Figure 8:
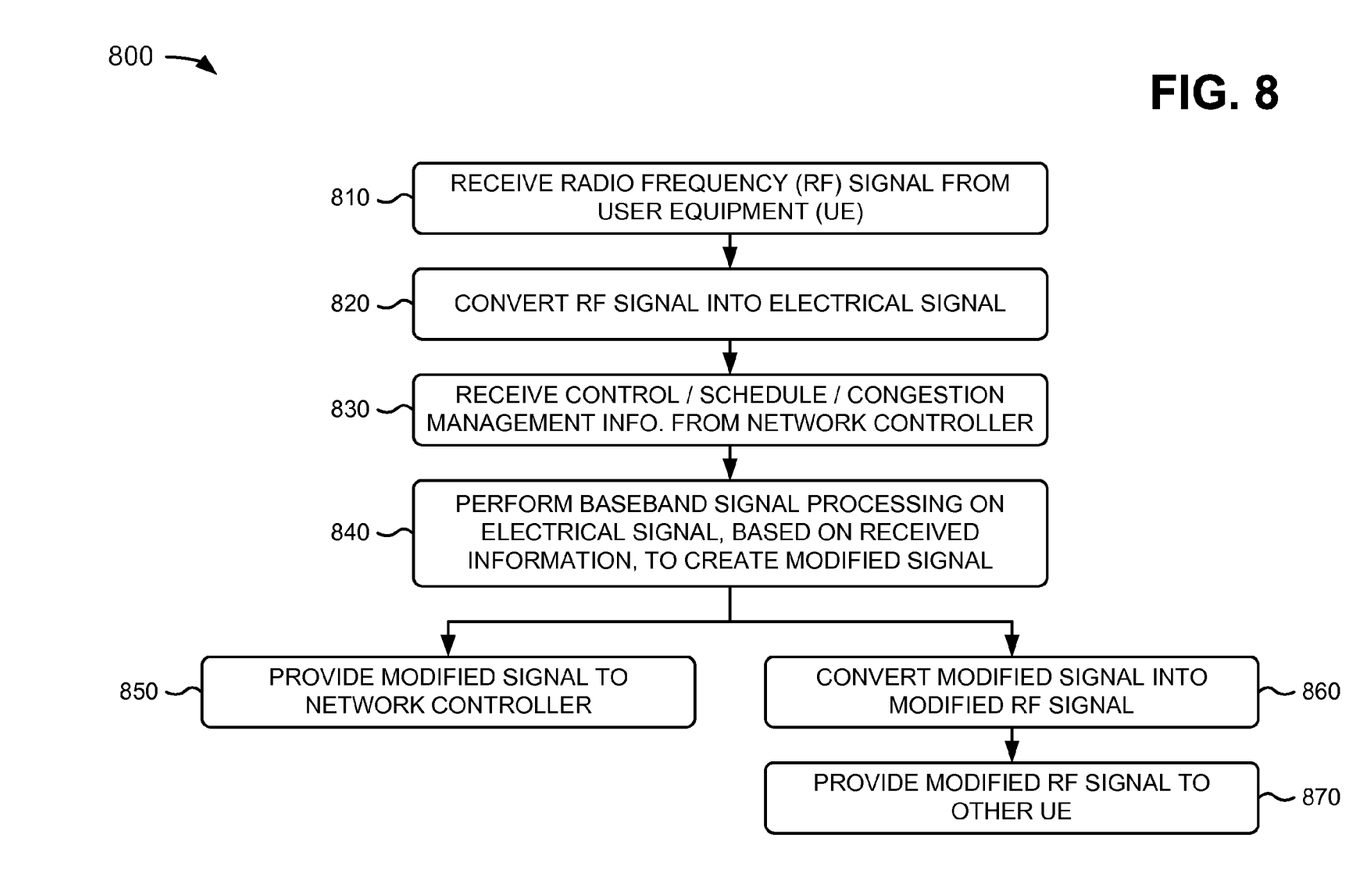
FIG. 8 is a flow chart of an example process for handling traffic at a network edge according to an implementation described herein.

FIG. 8 is a flow chart of an example process 800 for handling traffic at a network edge according to an implementation described herein. In one implementation, process 800 may be performed by RAH 126. Alternatively, or additionally, some or all of process 800 may be performed by another device or group of devices, including or excluding RAH 126.

As shown in FIG. 8, process 800 may include receiving a radio frequency (RF) signal from a user equipment (UE) (block 810), and converting the RF signal into an electrical signal (block 820). For example, in an implementation described above in connection with FIG. 5, UE 110-1 may provide RF signal 510-1 to RF module 300 of RAH 126-1, and RF module 300 may receive RF signal 510-1. RF signal 510-1 may include user traffic to be provided to other UEs 110 or to other elements of network 100. RF module 300 may convert RF signal 510-1 into converted signal 520-1 (e.g., an electrical signal, such as baseband signal), and may provide converted signal 520-1 to baseband module 310.

As further shown in FIG. 8, process 800 may include receiving control, schedule, and/or congestion management information from a network controller (block 830), and performing baseband signal processing on the electrical signal, based on the received information, to create a modified signal (block 840). For example, in an implementation described above in connection with FIG. 5, baseband module 310 may receive converted signal 520-1 from RF module 300, and may receive control, schedule, and/or congestion management information 530 from network controller 128. Baseband module 310 may perform baseband signal processing on converted signal 520-1, based on control, schedule, and/or congestion management information 530, to create modified signal 540-1. For example, baseband module 310 may perform signal to noise ratio correction on converted signal 520-1 to create modified signal 540-1, may incorporate feedback (e.g., RSRP and/or RSRQ feedback) into modified signal 540-1, etc.

Returning to FIG. 8, process 800 may include providing the modified signal to the network controller (block 850). For example, in an implementation described above in connection with FIG. 5, baseband module 310 may provide modified signal 540-1 to network controller 128, and network controller 128 may forward modified signal 540-1 to a destination, such as EPC network 130.

Alternatively, or additionally, and as further shown in FIG. 8, process 800 may include converting the modified signal into a modified RF signal (block 860), and providing the modified RF signal to another UE (block 870). For example, in an implementation described above in connection with FIG. 5, baseband module 310 may provide modified signal 540-1 to RF module 300. RF module 300 may convert modified signal 540-1 into modified RF signal 550-1, and may forward modified RF signal 550-1 to another destination, such as another UE 110.

Figure 9:
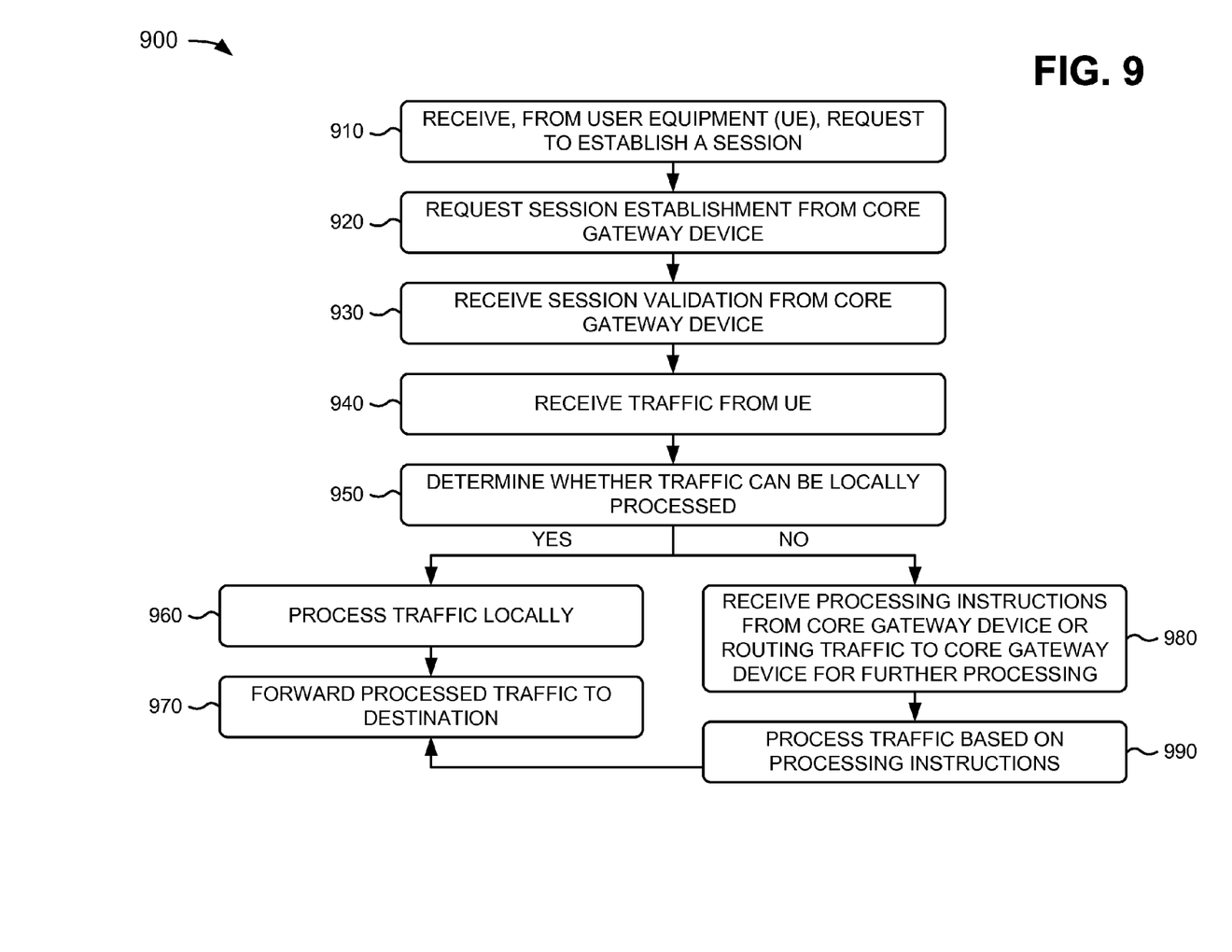
FIG. 9 is a flow chart of another example process for handling traffic at a network edge according to an implementation described herein.

FIG. 9 is a flow chart of another example process 900 for handling traffic at a network edge according to an implementation described herein. In one implementation, process 900 may be performed by probe device 630. Alternatively, or additionally, some or all of process 900 may be performed by another device or group of devices (e.g., by eNB 122), including or excluding probe device 630.

As shown in FIG. 9, process 900 may include receiving, from a user equipment (UE), a request to establish a session (block 910), requesting session establishment from a core gateway device (block 920), and receiving a session validation from the core gateway device (block 930). For example, in an implementation described above in connection with FIG. 7, UE 110 may provide session request 710 to vPGW 610, and vPGW 610 may receive session request 710. Session request 710 may include a request to establish a session for UE 110. vPGW 610 may request, from PGW 136, establishment of the session for UE 110, as indicated by reference number 720. PGW 136 may validate the session, and may provide session validation indication 730 to vPGW 610.

vPGW 610 may receive session validation indication 730, and may establish the session for UE 110.

As further shown in FIG. 9, process 900 may include receiving traffic from the UE (block 940), and determining whether the traffic can be locally processed (block 950). For example, in an implementation described above in connection with FIG. 7, after the session is validated and established for UE 110, UE 110 may provide user traffic 740 to vPGW 610, and vPGW 610 may receive user traffic 740. vPGW 610 may determine whether user traffic 740 can be locally processed by vPGW 610.

Returning to FIG. 9, if the traffic can be locally processed (block 950-YES), process 900 may include processing the traffic locally (block 960) and forwarding the processed traffic to a destination (block 970). For example, in an implementation described above in connection with FIG. 7, if user traffic 740 can be locally processed by vPGW 610, vPGW 610 may process user traffic 740 (e.g., may perform policy enforcement, packet filtering, charging support, lawful intercept, and packet screening), and may forward the processed user traffic 740 to a destination, as indicated by reference number 750.

As further shown in FIG. 9, if the traffic cannot be locally processed (block 950-NO), process 900 may include receiving processing instructions from the core gateway device or routing traffic to the core gateway device for further processing (block 980), processing the traffic based on the processing instructions (block 990), and forwarding the processed traffic to the destination (block 970). For example, in an implementation described above in connection with FIG. 7, if user traffic 740 cannot be locally processed by vPGW 610, vPGW 610 may query PGW 136 for processing instructions, as indicated by reference number 760. PGW 136 may provide processing instructions in a decision provided in response to the query, as further indicated by reference number 760. vPGW 610 may receive the processing instructions, and may process user traffic 740 based on the processing instructions. vPGW 610 may forward the processed user traffic 740 to a destination, as indicated by reference number 750.

Systems and/or methods described herein may provide for handling of network traffic at a network edge rather than within a core network. In one example implementation, a baseband processing module and a radio processing module may be located within a RAH provided at a network edge. One or more RAHs may connect (e.g., via a fiber connection) to a network controller, and the network controller may connect to one or more core network elements, such as a SGW, a PGW, a MME, etc. Such an arrangement may significantly reduce a transport data rate between the RAH and the network controller because data intensive communications (e.g., RSRP and RSRQ feedback) between the RAH and the baseband processing module may be eliminated by moving the baseband processing module to the RAH. Alternatively, or additionally, network traffic processing may be virtually provided at a network edge, such as within an eNB or within a probe device connected to the eNB. The virtual network processing may process network traffic in a manner typically handled by core network elements, such as a SGW, a PGW, etc.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  receiving, by a device provided at a network edge, a radio frequency signal from a user equipment,
    the device including a first module, implemented at least partially in hardware, and a second module, implemented at least partially in hardware, the first module being different than the second module;
  converting, by the device, the radio frequency signal into an electrical signal;
  transmitting, by the device and to a network controller, channel information;
  receiving, by the device and from the network controller and based on the transmitted channel information, at least two of:
    control information,
    schedule information, or
    congestion management information;
  performing, by the first module, baseband signal processing on the electrical signal, based on the at least two of the control information, the schedule information, or the congestion management information, to create a first modified signal;
  providing, by the device, the first modified signal to the network controller;
  creating, by the second module and using the first modified signal, a second modified signal; and
  providing, by the device, the second modified signal to another device,
    the other device being different than the user equipment and being different than the network controller.

2. The method of claim 1, where
  the second modified signal is a modified radio frequency signal, and
  the other device is another user equipment.

3. The method of claim 1, where the device includes a remote access head (RAH).

4. The method of claim 1, where
  the performing is based on the control information, and the control information includes information that at least one of:
  controls radio links associated with the device,
  sets the radio links associated with the device, or
  releases the radio links associated with the device.

5. The method of claim 1, where the schedule information includes information that schedules the device to transmit signals based on particular parameters.

6. The method of claim 1, where the congestion management information includes information that instructs the device to transmit signals based on traffic load conditions associated with the device.

7. The method of claim 1, where
the network controller controls a plurality of devices, and
the device is one of the plurality of devices.

8. The method of claim 7, where the network controller routes local traffic from the device to one or more of the plurality of devices.

9. A remote access head (RAH) comprising:
  a radio frequency module, implemented at least partially in hardware, to:
    receive a radio frequency signal from a user equipment;
    convert the radio frequency signal into an electrical signal; and
    provide the electrical signal to a baseband module,
      the radio frequency module being different than the baseband module; and
  the baseband module, implemented at least partially in hardware, to:
    transmit, to a network controller, channel information;
    receive, from the network controller and based on the transmitted channel information, at least two of:
      control information,
      schedule information, or
      congestion management information;
    perform baseband signal processing on the electrical signal, based on the at least two of the control information, the schedule information, or the congestion management information, to create a first modified signal; and
    provide the first modified signal to the network controller; and
  the radio frequency module is further to:
    create, using the first modified signal, a second modified signal,
      the second modified signal being different than the first modified signal; and
    provide the second modified signal for transmission to another device,
      the other device being different than the user equipment and being different than the network controller.

10. The remote access head of claim 9, where
the second modified signal is a modified radio frequency signal, and
the other device is another user equipment.

11. The remote access head of claim 9, where
the baseband signal processing is based on the control information, and
the control information includes information that at least one of:
  controls radio links associated with the remote access head,
  sets the radio links associated with the remote access head, or
  releases the radio links associated with the remote access head.

12. The remote access head of claim 9, where the baseband signal processing is based on the schedule information that includes information that schedules the remote access head to transmit signals based on traffic load parameters associated with the remote access head.

13. The remote access head of claim 9, where the baseband signal processing is based on the congestion management information that includes information that instructs the remote access head to transmit signals based on traffic load conditions associated with the remote access head.

14. A non-transitory computer-readable medium storing instructions, the instructions comprising:
  one or more instructions which, when executed by a device provided at a network edge, cause the device to:
    receive a radio frequency signal from a user equipment;
    convert the radio frequency signal into an electrical signal;
    transmit, to a network controller, channel information;
    receive, from the network controller and based on the transmitted channel information, at least two of:
      control information,
      schedule information, or
      congestion management information;
    perform, by a first module, implemented at least partially in hardware, of the device and based on the at least two of the control information, the schedule information, or the congestion management information, baseband signal processing on the electrical signal to create a first modified signal;
    provide the first modified signal to the network controller;
    create, by a second module, implemented at least partially in hardware, of the device and using the first modified signal, a second modified signal,
      the first module being different than the second module; and
    provide the second modified signal to another device,
      the other device being different than the user equipment and being different than the network controller.

15. The non-transitory computer-readable medium of claim 14, where the second modified signal is a modified radio frequency signal, and
the other device is another user equipment.

16. The non-transitory computer-readable medium of claim 14, where
the baseband signal processing is based on the control information, and
the control information includes information that at least one of:
  controls radio links associated with the device,
  sets the radio links associated with the device, or
  releases the radio links associated with the device.

17. The non-transitory computer-readable medium of claim 14, where the baseband signal processing is based on the schedule information that includes information that schedules the device to transmit signals based on traffic load parameters associated with the device.

18. The non-transitory computer-readable medium of claim 14, where the baseband signal processing is based on the congestion management information that includes information that instructs the device to transmit signals based on traffic load conditions associated with the device.

19. A device comprising:
  a first module implemented at least partially in hardware; and a second module implemented at least partially in hardware,
the first module being different than the second module,
the first module being to:
  receive a radio frequency signal from a user equipment; and
  convert the radio frequency signal into an electrical signal;
the second module being to:
  transmit, to a network controller, channel information;
  receive, from the network controller and based on the transmitted channel information, at least two of:
    control information,
    schedule information, or
    congestion management information;
  perform, based on the at least two of the control information, the schedule information, or the congestion management information, baseband signal processing on the electrical signal to create a first modified signal; and
  provide the first modified signal to the network controller; and
the first module being further to:
  create, using the first modified signal, a second modified signal; and
  provide the second modified signal to another device,
    the other device being different than the user equipment and being different than the network controller.

20. The device of claim 19, where
the second modified signal is a modified radio frequency signal, and
the other device is another user equipment.

21. The device of claim 19, where
the baseband signal processing is based on the control information, and
the control information includes information that at least one of:
  controls radio links associated with the device,
  sets the radio links associated with the device, or
  releases the radio links associated with the device.

22. The device of claim 19, where the baseband signal processing is based on the schedule information that includes information that schedules the device to transmit signals based on traffic load parameters associated with the device.

23. The device of claim 19, wherein the baseband signal processing is based on the congestion management information that includes information that instructs the device to transmit signals based on traffic load conditions associated with the device.

* * * * *